(12) United States Patent
Stopel et al.

(10) Patent No.: US 10,778,446 B2
(45) Date of Patent: *Sep. 15, 2020

(54) DETECTION OF VULNERABLE ROOT CERTIFICATES IN SOFTWARE CONTAINERS

(71) Applicant: Twistlock, Ltd., Herzliya (IL)

(72) Inventors: Dima Stopel, Herzliya (IL); John Morello, Baton Rouge, LA (US); Liron Levin, Herzliya (IL)

(73) Assignee: Twistlock, Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,757

(22) Filed: Feb. 16, 2017

(65) Prior Publication Data

US 2017/0187540 A1 Jun. 29, 2017

Related U.S. Application Data

(63) Continuation-in-part of application No. 15/292,915, filed on Oct. 13, 2016.
(Continued)

(51) Int. Cl.
*H04L 9/32* (2006.01)
*H04L 9/00* (2006.01)
(Continued)

(52) U.S. Cl.
CPC ........ *H04L 9/3268* (2013.01); *G06F 9/45558* (2013.01); *G06F 21/33* (2013.01);
(Continued)

(58) Field of Classification Search
CPC . H04L 63/061; H04L 41/0806; H04L 9/3268; H04L 9/3265; H04L 63/0823;
(Continued)

(56) References Cited

U.S. PATENT DOCUMENTS 6,490,620 B1 12/2002 Ditmer et al.
6,502,102 B1 12/2002 Haswell et al.
(Continued)

OTHER PUBLICATIONS

Economics of Information Security and Privacy III by Bruce Schneier (Editor) ISBN 978-1-4614-1981-5 (eBook) from (www.springer.com) pp. 38 (Year: 2013).*
(Continued)

*Primary Examiner* — Jeffrey C Pwu
*Assistant Examiner* — Ali H. Cheema
(74) *Attorney, Agent, or Firm* — M&B IP Analysts, LLC

(57) ABSTRACT

A method and system for detecting vulnerable root certificates in container images are provided. The method includes receiving an event to scan at least one container image hosted in a host device, wherein the least one container image includes resources utilized to execute, by the host device, at least a respective software application container; extracting contents of layers of the at least one container image; scanning the extracted contents to generate a first list designating all root certificates included in the at least one container image; generating a second list designating all root certificates trusted by the host device; comparing the first list to the second list to detect at least one root certificate designated in the first list but not in the second; and determining the at least one detected root certificate as vulnerable.

17 Claims, 5 Drawing Sheets

US 10,778,446 B2
Page 2

Related U.S. Application Data

(60) Provisional application No. 62/297,146, filed on Feb. 19, 2016, provisional application No. 62/241,812, filed on Oct. 15, 2015.

(51) Int. Cl.
| | | |
|---|---|---|
| *H04L 29/06* | (2006.01) | |
| *G06F 9/455* | (2018.01) | |
| *G06F 21/33* | (2013.01) | |
| *G06F 21/64* | (2013.01) | |
| *G06F 21/57* | (2013.01) | |
| *G06F 21/53* | (2013.01) | |
| *G06F 8/61* | (2018.01) | |
| *G06Q 20/32* | (2012.01) | |
| *G06F 21/51* | (2013.01) | |
| *G06F 21/60* | (2013.01) | |
| *G06F 16/11* | (2019.01) | |
| *G06F 9/50* | (2006.01) | |

(52) U.S. Cl.
CPC ............ *G06F 21/577* (2013.01); *G06F 21/64* (2013.01); *H04L 9/006* (2013.01); *H04L 63/1433* (2013.01); *G06F 8/63* (2013.01); *G06F 9/5055* (2013.01); *G06F 16/125* (2019.01); *G06F 21/51* (2013.01); *G06F 21/53* (2013.01); *G06F 21/57* (2013.01); *G06F 21/602* (2013.01); *G06F 2009/45587* (2013.01); *G06F 2221/033* (2013.01); *G06Q 20/3278* (2013.01)

(58) Field of Classification Search
CPC ... H04L 63/1433; H04L 63/14; H04L 63/101; H04L 63/06; H04L 63/0442; H04L 9/32; H04L 9/006; H04L 9/00; G06F 17/30085; G06F 21/51; G06F 9/45; G06F 9/45558; G06F 21/33; G06F 21/57; G06F 21/577; G06F 21/64; G06F 8/63; G06F 21/53; G06F 2009/45587; G06F 2221/033; G06F 9/5055; G06F 21/602; G06F 16/125; G11B 20/00086
USPC ..... 726/1, 22, 25, 4, 27; 713/156, 176, 158; 705/71; 370/255; 380/286
See application file for complete search history.

(56) References Cited

U.S. PATENT DOCUMENTS

| | | | |
|---|---|---|---|
| 6,523,027 | B1 | 2/2003 | Underwood |
| 6,704,873 | B1 | 3/2004 | Underwood |
| 6,732,162 | B1 | 5/2004 | Wood et al. |
| 7,100,195 | B1 | 8/2006 | Underwood |
| 7,103,740 | B1 | 9/2006 | Colgrove et al. |
| 7,577,848 | B2 | 8/2009 | Schwartz et al. |
| 7,596,227 | B2 | 9/2009 | Illowsky et al. |
| 7,640,235 | B2 | 12/2009 | Shulman et al. |
| 7,698,741 | B2 | 4/2010 | Marinescu et al. |
| 7,743,420 | B2 | 6/2010 | Shulman et al. |
| 7,752,662 | B2 | 7/2010 | Shulman et al. |
| 7,752,669 | B2 | 7/2010 | Palliyil et al. |
| 7,779,468 | B1 | 8/2010 | Magdych et al. |
| 7,861,303 | B2 | 12/2010 | Kouznetsov et al. |
| 7,882,542 | B2 | 2/2011 | Neystadt et al. |
| 8,024,804 | B2 | 9/2011 | Shulman et al. |
| 8,051,484 | B2 | 11/2011 | Shulman et al. |
| 8,056,141 | B2 | 11/2011 | Shulman et al. |
| 8,108,933 | B2 | 1/2012 | Mahaffey |
| 8,135,948 | B2 | 3/2012 | Shulman et al. |
| 8,181,246 | B2 | 5/2012 | Shulman et al. |
| 8,302,192 | B1 | 10/2012 | Cnudde et al. |
| 8,316,237 | B1 | 11/2012 | Felsher et al. |
| 8,499,150 | B1* | 7/2013 | Nachenberg .......... H04L 9/3268 713/156 |
| 8,510,571 | B1 | 8/2013 | Chang et al. |
| 8,621,613 | B1 | 12/2013 | McClintock et al. |
| 8,639,625 | B1 | 1/2014 | Ginter et al. |
| 8,677,472 | B1 | 3/2014 | Dotan et al. |
| 8,756,683 | B2 | 6/2014 | Manion et al. |
| 8,806,625 | B1 | 8/2014 | Berger |
| 8,966,629 | B2 | 2/2015 | Sallam |
| 9,003,141 | B2 | 4/2015 | Nielsen et al. |
| 9,098,333 | B1 | 8/2015 | Obrecht et al. |
| 9,203,862 | B1 | 12/2015 | Kashyap et al. |
| 9,223,966 | B1 | 12/2015 | Satish et al. |
| 9,256,467 | B1* | 2/2016 | Singh .................... G06F 9/5055 |
| 9,355,248 | B1 | 5/2016 | Wiest et al. |
| 9,401,922 | B1 | 7/2016 | Walters |
| 9,594,590 | B2 | 3/2017 | Hsu |
| 9,904,781 | B2 | 2/2018 | Martini et al. |
| 9,928,379 | B1 | 3/2018 | Hoffer |
| 10,223,534 | B2 | 3/2019 | Stopel et al. |
| 10,333,967 | B2* | 6/2019 | Litva ..................... H04W 12/08 |
| 2001/0007131 | A1 | 7/2001 | Galasso et al. |
| 2003/0014629 | A1* | 1/2003 | Zuccherato .......... H04L 9/3268 713/156 |
| 2003/0079145 | A1 | 4/2003 | Kouznetsov et al. |
| 2003/0120593 | A1 | 6/2003 | Bansal et al. |
| 2003/0229801 | A1 | 12/2003 | Kouznetsov et al. |
| 2003/0233566 | A1 | 12/2003 | Kouznetsov et al. |
| 2003/0233574 | A1 | 12/2003 | Kouznetsov et al. |
| 2004/0133793 | A1 | 7/2004 | Ginter et al. |
| 2005/0120054 | A1 | 6/2005 | Shulman et al. |
| 2005/0177715 | A1* | 8/2005 | Somin ................ H04L 63/0442 713/156 |
| 2006/0075494 | A1 | 4/2006 | Bertman et al. |
| 2006/0230451 | A1* | 10/2006 | Kramer .................. G06F 21/51 726/22 |
| 2006/0282664 | A1* | 12/2006 | Zhao ..................... H04L 63/101 713/158 |
| 2006/0288420 | A1 | 12/2006 | Mantripragada et al. |
| 2007/0112714 | A1 | 5/2007 | Fairweather |
| 2007/0130621 | A1 | 6/2007 | Marinescu et al. |
| 2007/0136282 | A1* | 6/2007 | Takashima ......... G11B 20/00086 |
| 2007/0174630 | A1 | 7/2007 | Shannon et al. |
| 2007/0240218 | A1 | 10/2007 | Tuvell et al. |
| 2007/0240220 | A1 | 10/2007 | Tuvell et al. |
| 2007/0240221 | A1 | 10/2007 | Tuvell et al. |
| 2007/0240222 | A1 | 10/2007 | Tuvell et al. |
| 2008/0086773 | A1 | 4/2008 | Tuvell et al. |
| 2008/0134177 | A1 | 6/2008 | Fitzgerald et al. |
| 2008/0168135 | A1 | 7/2008 | Redlich et al. |
| 2008/0177994 | A1 | 7/2008 | Mayer |
| 2008/0196104 | A1 | 8/2008 | Tuvell et al. |
| 2009/0144823 | A1 | 6/2009 | Lamastra et al. |
| 2009/0217260 | A1 | 8/2009 | Gebhart et al. |
| 2009/0319796 | A1* | 12/2009 | Kim ..................... H04L 63/0823 713/176 |
| 2010/0011029 | A1 | 1/2010 | Niemela |
| 2011/0116637 | A1* | 5/2011 | Schiefelbein ........... H04L 63/06 380/286 |
| 2011/0179484 | A1 | 7/2011 | Tuvell et al. |
| 2011/0258701 | A1 | 10/2011 | Cruz et al. |
| 2011/0314542 | A1 | 12/2011 | Viswanathan et al. |
| 2011/0314548 | A1 | 12/2011 | Yoo |
| 2011/0321139 | A1* | 12/2011 | Jayaraman ............... G06F 21/51 726/4 |
| 2012/0008529 | A1* | 1/2012 | Averbuch ............ H04L 41/0806 370/255 |
| 2012/0023584 | A1 | 1/2012 | Yoo |
| 2012/0036572 | A1 | 2/2012 | Yoo |
| 2012/0042375 | A1 | 2/2012 | Yoo |
| 2012/0117203 | A1 | 5/2012 | Taylor et al. |
| 2013/0073388 | A1 | 3/2013 | Heath |
| 2014/0059226 | A1 | 2/2014 | Messerli et al. |
| 2014/0181894 | A1* | 6/2014 | Von Bokern ........... H04L 63/061 726/1 |
| 2014/0237550 | A1 | 8/2014 | Anderson et al. |
| 2014/0283071 | A1 | 9/2014 | Spikes |

(56) References Cited

U.S. PATENT DOCUMENTS

| | | | |
|---|---|---|---|
| 2014/0337234 A1* | 11/2014 | Tang | G06Q 20/3278 |
| | | | 705/71 |
| 2015/0156183 A1 | 6/2015 | Beyer et al. | |
| 2015/0178497 A1 | 6/2015 | Lukacs et al. | |
| 2015/0220735 A1 | 8/2015 | Paithane et al. | |
| 2015/0271139 A1 | 9/2015 | Lukacs et al. | |
| 2015/0332043 A1 | 11/2015 | Russello | |
| 2015/0379287 A1* | 12/2015 | Mathur | G06F 21/602 |
| | | | 726/27 |
| 2016/0323315 A1 | 11/2016 | Hathaway et al. | |
| 2017/0063557 A1* | 3/2017 | Chalmandrier-Perna | |
| | | | H04L 9/3268 |
| 2017/0068676 A1* | 3/2017 | Jayachandran | G06F 16/125 |
| 2017/0177877 A1 | 6/2017 | Suarez et al. | |
| 2017/0244748 A1 | 8/2017 | Krause et al. | |

OTHER PUBLICATIONS

Internet X.509 Public Key Infrastructure Certificate and Certificate Revocation List (CRL) Profile R. Housley, W. Polk, W. Ford and D. Solo pp. 259; April (Year: 2002).*

RFC 5280—Internet X.509 Public Key Infrastructure Certificate and Certificate Revocation List (CRL) Profile D. Cooper, S. Santesson, S. Boeyen, R. Housley and W. Polk pp. 151; May (Year: 2008).*

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.

Cziva, et al., "Container-based Network Function Virtualization for Software-Defined Networks," 2015 IEEE Symposium on Computers and Communication (ISCC), pp. 415-420, Scotland.

Dhakchianandan, et al., "Memory Efficacious Pattern Matching Intrusion Detection System", 2013 International Conference on Recent Trends in Information Technology (ICRTIT), pp. 652-656, Anna University, Chennai, India.

Guenane, et al, "Autonomous Architecture for Managing Firewalling Cloud-Based Service," 2014 International Conference and Workshop on the Network of the Future (NOF), Paris, France, pp. 1-5.

Rehak, et al., "Adaptive Multiagent System for Network Traffic Monitoring," IEEE Intelligent Systems, vol. 24, Issue: 3, 2009, Czechia, pp. 17-25.

Shouman, et al., "Surviving Cyber Warfare With a Hybrid Multiagent-based Intrusion Prevention System," IEEE Potentials, vol. 29, Issue: 1, 2010, pp. 32-40.

Song, et al., "A Control Theoretical Approach for Flow Control to Mitigate Bandwidth Attacks," 2006 IEEE Information Assurance Workshop, West Point, NY, pp. 348-360.

Van Niekerk, et al., "Cloud-Based Security Mechanisms for Critical Information Infrastructure Protection," 2013 International Conference on Adaptive Science and Technology, South Africa, pp. 1-4.

Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.

Zhauniarovich, et al., "MOSES: Supporting and Enforcing Security Profiles on Smartphones," IEEE Transactions on Dependable and Secure Computing, vol. 11, Issue: 3, pp. 211-223, 2014.

Kovatsch, et. al., "A RESTful Runtime Container for Scriptable Internet of Things Applications", 3rd IEEE International Conference on the Internet of Things, Oct. 2012.

Mattetti, et. al., "Securing the Infrastructure and the Workloads of Linux Containers", IEEE Conference on Communications and Network Security (CNS), 2015.

Pan, et. al., Robust Container Code Recognition System, Fifth World Congress on Intelligent Control and Automation, 2004.

Azkia, et al., "Reconciling IHE-ATNA Profile with a posteriori Contextual Access and Usage Control Policy in Healthcare Environment", 2010 Sixth International Conference on Information Assurance and Security, 2010 IEEE, pp. 197-203, Cesson, Sevigne, France.

Skillen, et al., "Mobiflage: Deniable Storage Encryption for Mobile Devices," IEEE Transaction on Dependable and Secure Computing, vol. 11, No. 3, May-Jun. 2014, 2013 IEEE, pp. 224-237, Canada.

Balazsi, et al., "Software System for Broadcasting and Monitoring Traffic Information", 2014 IEEE 12th International Symposium on Intelligent Systems and Informatics (SISY), 2014, pp. 39-42, Subotica, Serbia.

Jing, et al., "A Context-aware Disaster Response System Using Mobile Software Technologies and Collaborative Filtering Approach", 2014 IEEE 18th International Conference on Computer Supported Cooperative Work in Design, 2014, pp. 516-522, China.

* cited by examiner

DETECTION OF VULNERABLE ROOT CERTIFICATES IN SOFTWARE CONTAINERS

CROSS-REFERENCE TO RELATED APPLICATIONS

This application claims priority from U.S. Provisional Patent Application No. 62/297,146 filed on Feb. 19, 2016. This patent application is also a continuation-in-part (CIP) application of: U.S. patent application Ser. No. 15/292,915 filed on Oct. 13, 2016, which claims priority from U.S. Provisional Patent Application No. 62/241,812 filed on Oct. 15, 2015. The contents of the above-referenced applications are hereby incorporated by reference.

TECHNICAL FIELD

The present disclosure generally relates to software containers, and more particularly to detection of vulnerable root certificates in software containers.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (also known as a container) provides an executable environment with a complete filesystem. The filesystem may contain code, runtime, system tools, system libraries, and so on. That is, execution of a software container can be the same regardless of the underlying infrastructure. A Docker is one of the popular existing platforms for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux® Kernel can be accessed directly using the libcontainer library or indirectly using the libvirt service.

As demonstrated in FIG. 1, a number of software containers (i.e., the app containers 110-1 through 110-$n$, hereinafter referred to individually as a container 110, merely for simplicity purposes) can access and share the same OS kernel 120. However, each software container 110 can be constrained to only use a defined amount of hardware resources (e.g., CPU, memory, etc.) in the underlying hardware layer 130 of the host 150. Thus, using software containers, hardware resources can be isolated, services can be restricted, and processes can be provisioned to have an almost completely private view of the operating system with their own process ID space, file system structure, and network interfaces.

FIG. 2 illustrates a typical structure of an image of a software container (hereinafter a "container image") 200. The container image 200 includes a base image 210 and a container layer 220. The base image 210 includes one or more image layers 215-1 through 215-$q$ (hereinafter referred to individually as a layer 215 and collectively as layers 215, merely for simplicity purposes). The layers 215 are read-only layers that represent filesystem differences. That is, the layers 215 are stacked on top of each other to form a base for the root file system of the container image 200. The layers 215 are read only, and each layer 215 is identified by a randomly generated identifier number of a checksum computed using a hash function.

The base image 210 (and its layers 215) can be shared across different software containers. Thus, only the container layer 220, which is the top layer, differentiates between one software container and another. The container layer 220 is a readable and writable layer where all data written to the container image 200 are saved in the container layer 220. The container layer 220 defines the application of an application container when executed. The container image 200 is a static file and the application container is a runtime instance of the container image 200. When the container image 200 is deleted, the writable container layer 220 is also deleted, and the base image 210 remains unchanged. As such, the multiple container images 200 can share access to the same base image 210, each of which has its own data state. In the example demonstrated in FIG. 2, the software container 200 is a Docker container (e.g., compliant with the Docker platform).

The container image 200 may include one or more root certificates (not shown). A root certificate is part of a public key infrastructure scheme. Such a scheme typically includes a digital signature from a certificate authority. A certificate authority (CA) can issue multiple certificates in the form of a tree structure. A root certificate is the top-most certificate of the tree, the private key of which is used to "sign" other certificates.

The root certificates may be trusted by the creator of the container image 200, but not by the host executing the respective software container. For example, a root certificate may be a legitimate self-signed certificate. However, the host 150 (FIG. 1) when executing the respective application container (e.g., container 110-1) may not recognize or trust the certificate. The app container may run a malicious code that can exploit a root certificate untrusted by the host. For example, the certificate may be a self-signed root HTTPS certificate that can intercept encrypted traffic sent or received from websites. When an HTTPS website is accessed, the website certificate is signed and controlled by the certificate and malicious code that are being falsely represented as a root certificate trusted by the host.

Typically, an application container can be secured separately from other application containers. Thus, one software container cannot access the resources of other software containers. However, the isolation of application containers cannot prevent the execution of malicious code. Malicious activity by software containers can occur through exploitation of at least root certificates (and other programs) defined in the container. For example, a root certificate's vulnerabilities containers can be exploited to carry out HTTPS man-in-the-middle attacks where encrypted traffic can be hijacked by an attacker.

To prevent integration of malicious images containing un-trusted root certificates in an application (APP) container, detection of vulnerabilities in images should occur prior to the execution of the application container.

Existing security solutions are not designed to detect vulnerabilities in images of application containers. Specifically, images have a specific structure that cannot be processed by existing security solutions. For example, a conventional antivirus tool cannot scan images to detect computer viruses, as such a tool cannot extract the different layers of an image and cannot parse each layer to analyze its contents.

In addition, currently there is no security tool that can check for vulnerabilities in base images, as such images are uploaded to a registry (e.g., during a continuous integration process). As the popularity of software containers has increased due to the easy integration with cloud-computing platforms (e.g., Amazon® Web Services, Google® Cloud Platform, Microsoft® Azure, etc.), the lack of defense against vulnerable container images and root certificates is a major drawback.

It would be therefore advantageous to provide a solution that would secure base images of software containers and image registries.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for detecting vulnerable root certificates in container images. The method includes receiving an event to scan at least one container image hosted in a host device, wherein the least one container image includes resources utilized to execute, by the host device, at least a respective software application container; extracting contents of layers of the at least one container image; scanning the extracted contents to generate a first list designating all root certificates included in the at least one container image; generating a second list designating all root certificates trusted by the host device; comparing the first list to the second list to detect at least one root certificate designated in the first list but not in the second; and determining the at least one detected root certificate as vulnerable.

Some embodiments disclosed herein include a host device for detecting vulnerable root certificates in container images. The host device includes a processing system; and a memory, the memory containing instructions that, when executed by the processing system, configure the host device to: receive an event to scan at least one container image hosted in a host device, wherein the least one container image includes resources utilized to execute, by the host device, at least a respective software application container; extract contents of layers of the at least one container image; scan the extracted contents to generate a first list designating all root certificates included in the at least one container image; generate a second list designating all root certificates trusted by the host device; compare the first list to the second list to detect at least one root certificate designated in the first list but not in the second; and determine the at least one detected root certificate as vulnerable.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
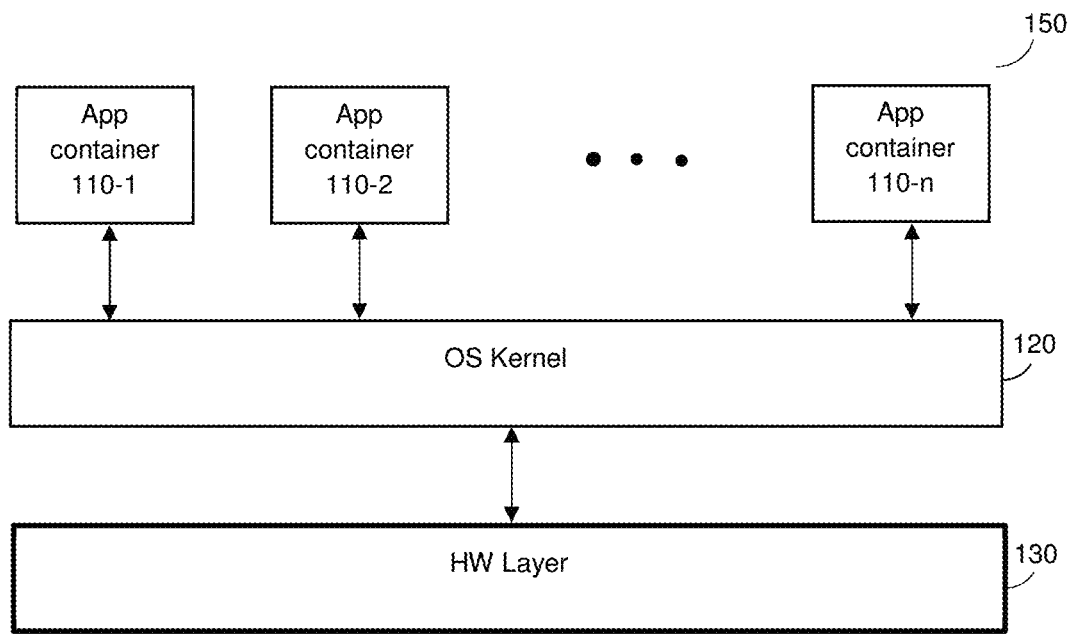
FIG. 1 is a diagram illustrating the execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include techniques for detecting vulnerable root certificates in container images. A container image is scanned to detect any root certificates stored therein. The scanning may include parsing of the container image's structure. Each detected root certificate is matched against a list of root certificates trusted by a host device storing the container image and configured to execute a respective application container. Any mismatched root certificate is determined as a vulnerable certificate. In an embodiment, each detected root certificate is analyzed and checked for its validity. Any root certificate that does not pass the integrity check is determined as a vulnerable certificate. In one embodiment, a prevention action is taken to mitigate potential risk of an execution application container associated with the vulnerable certificate.

Figure 3:
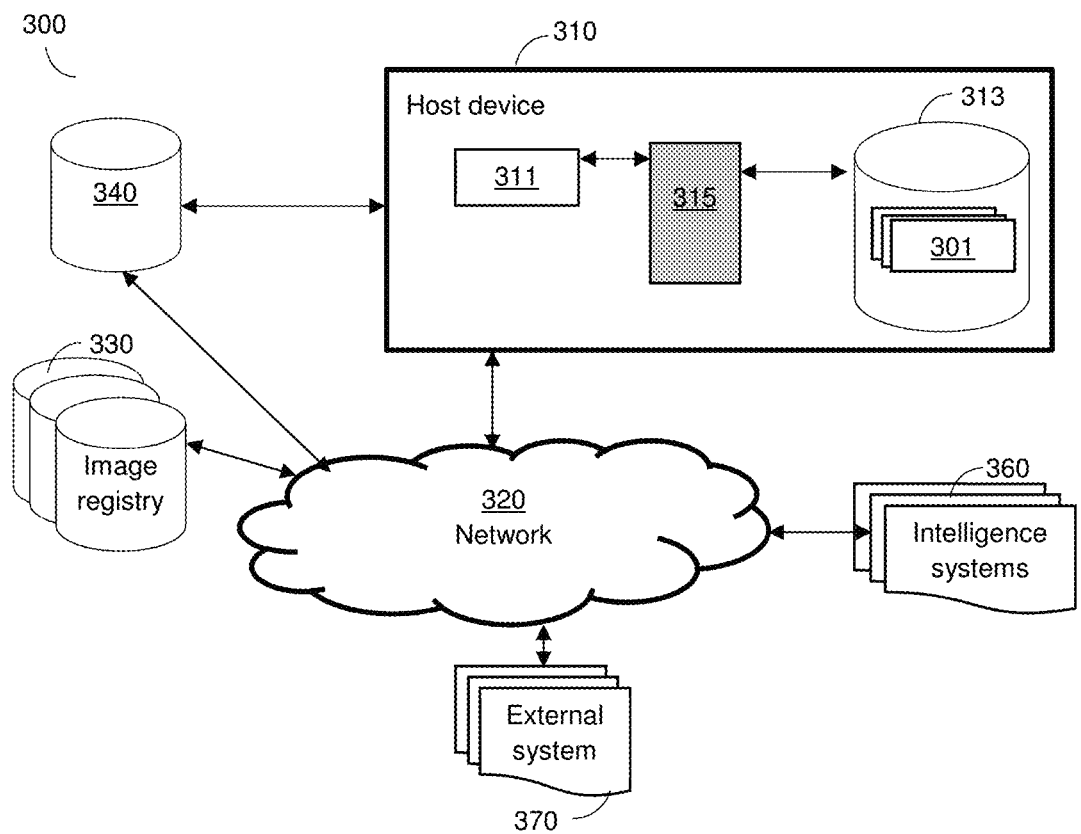
FIG. 3 is a network diagram utilized to describe the various disclosed embodiments.

FIG. 3 is an example network diagram 300 utilized to describe the various disclosed embodiments. A host device 310 is communicatively connected to a network 320. The host device 310 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

Figure 2:
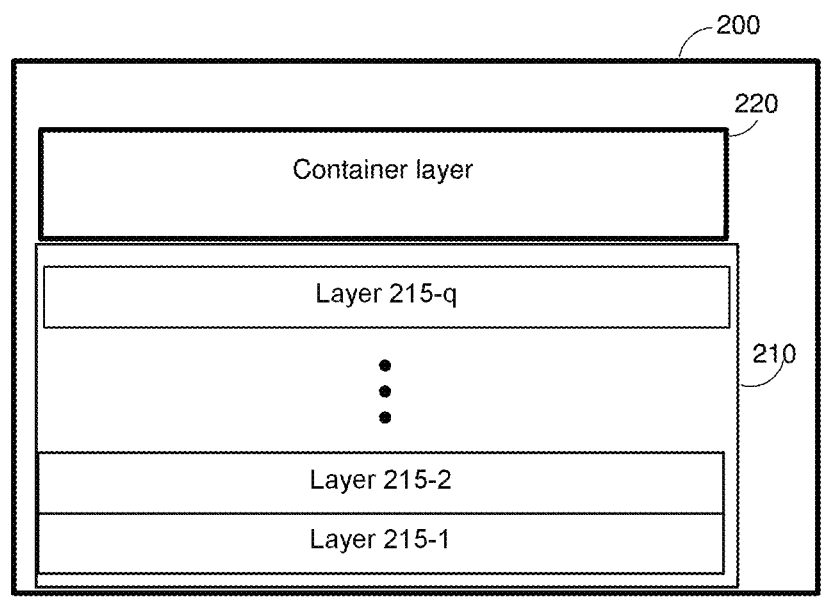
FIG. 2 is a diagram illustrating a structure of a software container.

Also communicatively connected to the network 320 is one or more image registries 330 (collectively referred to hereinafter as image registries 330 and individually as an image registry 330, merely for simplicity purposes). Each image registry 330 stores container images (not shown) that can be imported and executed on the host device 310. An example container image is shown in FIG. 2.

An image registry 330 may be, but is not limited to, Docker Hub, Google® Container Registry, Amazon® EC2 Container Registry, Artifactory, and the like. The image registry 330 is a data repository that allows programming and testing of container images. An image registry 330 typically provides a centralized resource for discovery, distribution, management, and collaboration of container images. An image registry 330 may be a cloud-based registry service or may be on-premises. In certain configurations, container images 301 can be locally stored at the host device 310, e.g., in a registry 313.

According to the disclosed embodiments, the host device 310 is configured to host and execute a detector container 315. The detector container 315 is a software (application) container designed to at least detect vulnerable root certificates stored in each container image saved or uploaded to the host 310. The detection is performed prior to the execution of the respective APP container. For example, a host device 310 includes a container image 311, where the runtime instance of the image 311 is an APP container.

In an embodiment, the host device 310 (and the detector container 315) are configured to interface with a continuous integration (CI) system (not shown). Typically, a CI system allows for building, testing, and uploading of container images to the image registries 330. Examples for such a CI system include Jenkins®, Appveyor®, TeamCity, Bamboo, and the like. In an example embodiment, the interface between the host device 310 and the system may be realized as an API or a plugin. The host device 310 is also communicatively connected to a database 340. The database 340 is configured to store trusted root certificates, generated certificate lists (mentioned below), and detected vulnerable certificates.

In an embodiment, the host device 310 is communicatively connected to one or more intelligence systems 360 through the network 320. The intelligence systems 360 may include common vulnerabilities and exposures (CVE®) databases, reputation services, security systems (providing feeds on discovered threats), and so on. The information provided by the intelligence systems 360 is utilized to detect certain vulnerabilities, and in particular to check the integrity of certificates.

The host device 310 may be communicatively connected to one or more external systems 370 through the network 320. Examples for such external systems 370 may include, but are not limited to, an active directory of an organization to retrieve user permissions, access control systems (e.g., Docker Swarm, Kubernetes management plane, etc.), SIEM systems to report on detected vulnerabilities, audit and compliance systems, and the like.

According to the disclosed embodiments, the detector container 315 is configured to receive an event indicating that a container image has been uploaded to the host device 310. The event includes at least a source of the image (e.g., a registry's network address or a check-in system) and an identifier of the container image to be checked. In some embodiments, the event may be generated by the host device 310 when a new container image is uploaded to the host or when an image is locally stored in the host device 310 and is ready for execution. In another embodiment, the event may include a request to scan all container images 301 in the host registry 313.

As discussed above, a container image includes a container layer (e.g., the layer 210, FIG. 2) which sets the application executed by a container and a plurality of image layers (e.g., the layers 215, FIG. 2), each of which is uniquely identified. Each container image may be assigned with a unique identifier, which may be computed as a check-sum or hash value computed over the contents of the layer.

In an embodiment, upon receiving an event, the respective container image (e.g., a container image 301) is checked for vulnerable root certificates. The vulnerability check is performed through static analysis of the various layers, that is, without execution of the container image 301. The vulnerability check process will be discussed with reference to the container image 301.

In an embodiment, the detector container 315 is configured to reformat the container image 301 into a data structure that can be processed. For example, the data structure may be reformatted to be, but is not limited to, a file having a standard format, a TAR (Tape ARchive) file, and the like. In another embodiment, the detector container 315 is configured to create a container filesystem (e.g., using a Docker platform) for the container image 301. The filesystem is created without executing the container image 301 or the created filesystem. That is, the detector container 315 does not execute any of the binaries that the container image 301 contains within the newly created instance of the application container. Rather, the detector container 315 is configured to execute a scanning process for scanning the filesystem and evaluating the security state of the container image 301 as discussed herein.

It should be noted that reformatting or creating a filesystem for the container image 301 includes extracting the structure of its layers. The extracted contents of the base container image 301 can be scanned, parsed, or otherwise processed to detect vulnerabilities in root certificates included in the container image 301.

Specifically, according to some embodiments, the scanning includes the identification of any root certificate stored in the container image 301. The scanning process attempts to identify a string formatted in one of the standard public key infrastructure (PKI) formats, for example, the ITU-T X.509 standard. In an embodiment, the scanning may include a first search for common file extensions associated with digital certificates. For example, common extensions defined in the X.509 standards include .CRT, .CER, and .KEY. One of ordinary skill would be familiar with these extensions.

Upon identification of a certificate file (having a digital certificate extension), the contents of the file (digital certificate) is further scanned to determine its unique identifier. A typical certificate complies with the X.509 standard which includes the following fields of information: a version number, a serial number, a signature algorithm ID, an issuer name, a validity period, a subject name, public key information, a public key algorithm, a public key, a certificate signature algorithm, and a certificate signature. It should be noted that although digital certificates are typically encoded, such certificates can be viewed in a readable form. For example, using Linux 'openssl x509' command on the certificate file name, the contents of the certificate would be output to a text file.

The unique identifier assigned for each identified certificate may be set based on a specific field or any combination of the fields of information. For example, the unique identifier may be the certificate signature or a combination of the version number, serial number, and, issuer name.

Scanning of the container image 301 would result in a first list of certificates (hereinafter the "container certificate list"). Each certificate in the container certificate list is designated by at least its associated unique identifier. A certificate in the list may also be designated by its the file name (e.g., cert-123.crt) a saved in the container image 301.

The detector container 315 is also configured to generate a list of certificates trusted by the host 310 (hereinafter the "host certificate list"). To this end, the detector container 315 is first configured to retrieve all certificates stored in the host 310. The certificates are typically stored in a certificate directory, where its location is based on the operating system. For each retrieved certificate, a unique identifier is assigned.

The unique identifier may be set using the same field (or fields) used to generate the container certificate list. For example, the unique identifier of a host's certificate may be the certificate signature or a combination of the version number, serial number, and issuer name. The generated host certificate list includes at least a unique identifier associated with each certificate in the host certificate directory. The host certificate list may also designate the file name of the certificate.

The detector container 315 is also configured to compare the host certificate list to the container certificate list. Any root certificate designated in the container certificate list but not in the host certificate list is determined to be vulnerable.

Figure 4:
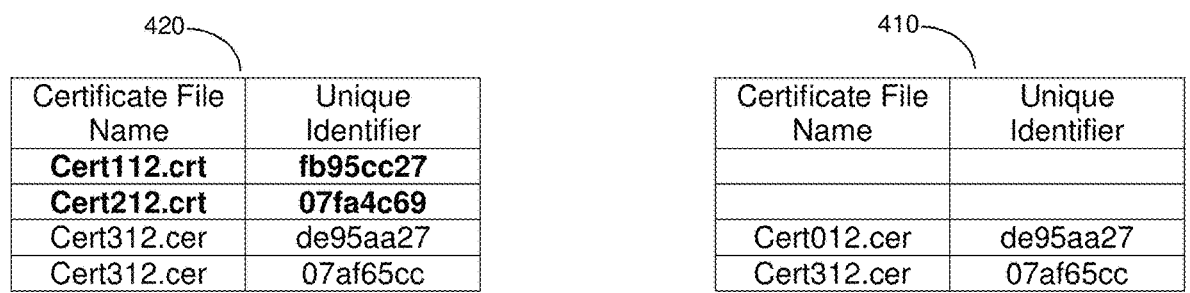
FIG. 4 is a diagram of the container and host certificate lists generated according to an embodiment.

As an example, FIG. 4 shows a host certificate list 410 to a container certificate list 420. Each entry includes a unique identifier and certificate name. As noted in FIG. 4, the certificates having the identifiers "07fa4c69" and "fb95cc27" are not included in the host certificate list 410, but only in the container certificate list 420. It should be noted that the file name of the certificates may be the same, but their identifiers are different. Such certificates are also considered vulnerable.

In an embodiment, each public root certificate designated in the container certificate list 420 is checked for validity. In an example implementation, the validity check is performed only when the two generated lists 410 and 420 are fully matched. The validity check is performed using feeds received from the intelligence system 360, certificates stored in the database 340, or both.

In one embodiment, the validity check includes comparing the contents of a public certificate designated in the container certificate list 420 with a respective public certificate known to be valid. Such a certificate may be stored in the database 340 or retrieved from a trusted resource. For example, if a public root certificate in the container is a "GeoTrust Global CA", the contents of a valid "Geo Trust Global CA" is obtained from the database 340 (or other trusted resource) and compared to the contents of the public root certificate in the container image 301. For example, the contents of a valid "GeoTrust Global CA" are:

Subject DN: C=US, O=Geo Trust Inc., CN=Geo Trust Global CA
Operational Start Date: May 21 04:00:00 2002 GMT
Operational End Date: May 21 04:00:00 2022 GMT
Key Size: 2048 bit
Signature Algorithm: sha1WithRSAEncryption
Serial Number: 02 34 56
SHA-1 Thumbprint: DE 28 F4 A4 FF E5 89 2F A3 C5 03 D1 A3 49 A7 F9 96 2A 82 12
Hierarchy: Public TLS/SSL, CodeSigning, Client Auth/Email The contents of the "GeoTrust Global CA" in the container image 310 should be the same as in the above example in order to be determined valid. It should be noted that the comparison can be performed over the ASCII Code of the certificates.

In another embodiment, the validity check is based on intelligence information received from one or more of the intelligence systems 360. As an example, the intelligence information may include an indication of the certificates that are no longer valid, that have been compromised, that are known to be vulnerable, and so on. Any certificate designated in the intelligence information is compared to the certificates designated in the container certificate lists.

Upon detection of a vulnerable root certificate, a detection event is generated and reported. Such a detection event may include, but is not limited to, a container image identifier, an identifier of any detected vulnerable certificate, a type of the detected vulnerability, and so on. The detection event is saved in the database 340, reported to an external system, or both. In an embodiment, a prevention action is taken to mitigate any risk associated with the container image including the vulnerable certificate. The mitigation action may include, for example, preventing any execution of an application container (e.g. container 110-1) that is based on a vulnerable container image.

In some embodiments, prior to generating the lists, it is checked if the container image requested to be scanned has been already checked for certificate vulnerabilities. Each container image is uniquely identified using a unitary signature. The unitary signature may be a check-sum over the contents of the layer. The unitary signature of each scanned container is saved in the database 340 to determine if a repeated scanning of the container image 301 is required. That is, upon receiving a request to scan a container image, a unitary signature is computed for the image that is requested to be scanned. The computed unitary signatures are matched to those saved in the database 340. If the compared unitary signatures are the same, then the container image is determined to be safe and is not scanned again. Otherwise, the container image is scanned as discussed in detail herein above.

The embodiments disclosed herein are not limited to the specific architecture illustrated in FIG. 3, and other architectures may be used without departing from the scope of the disclosed embodiments. Specifically, in an embodiment, there may be a plurality of detector containers 315 operating as described hereinabove and configured to either have one as a standby, to share loads between them, or to split the functions between them. In addition, other software containers or processes that handle the management and configuration of the detector container 315 may be hosted in the device 310. Examples for such software containers or processes may include a Docker engine, a networking container, drivers, and so on.

Furthermore, the detector container 315 can be realized as a software container. A software container provides an executable environment with a complete filesystem. A software container may include a micro-service, a Docker container, a light virtual machine, and the like.

Figure 5:
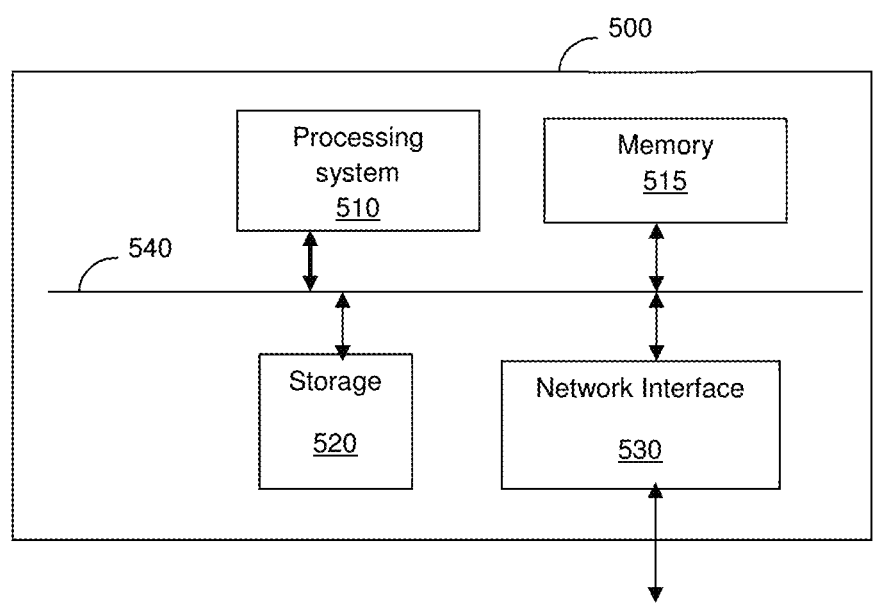
FIG. 5 is a block diagram of a hardware layer in a host device utilized to execute at least a detector container and a console container according to an embodiment.

It should be appreciated that the host device 310 requires an underlying hardware layer to execute the OS, VMs, and software containers. An example block diagram of a hardware layer 500 is shown in FIG. 5. The hardware layer 500 includes a processing system 510, a memory 515, a storage 520, and a network interface 530, all connected to a computer bus 540.

The processing system 510 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 515 may be volatile, non-volatile, or a combination thereof. The storage 520 may be magnetic storage, optical storage, and the like.

In one configuration, computer readable instructions to implement one or more embodiments disclosed herein may be stored in the storage 520. The storage 520 may also store other computer readable instructions to implement an operating system, an application program, and the like. Computer readable instructions may be loaded in the memory for execution by the processing system 510.

In another embodiment, the storage 520, the memory 515, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 510 to perform the various functions described herein with respect to at least detection of vulnerabilities in root certificates included in container images.

The network interface 530 allows communication with other external systems or host devices through a network (e.g., the network 320). The network interface 530 may include a wired connection or a wireless connection. The network interface 530 may transmit communication media, receive communication media, or both. The computer bus 540 may be, for example, a PCIe bus.

Figure 6:
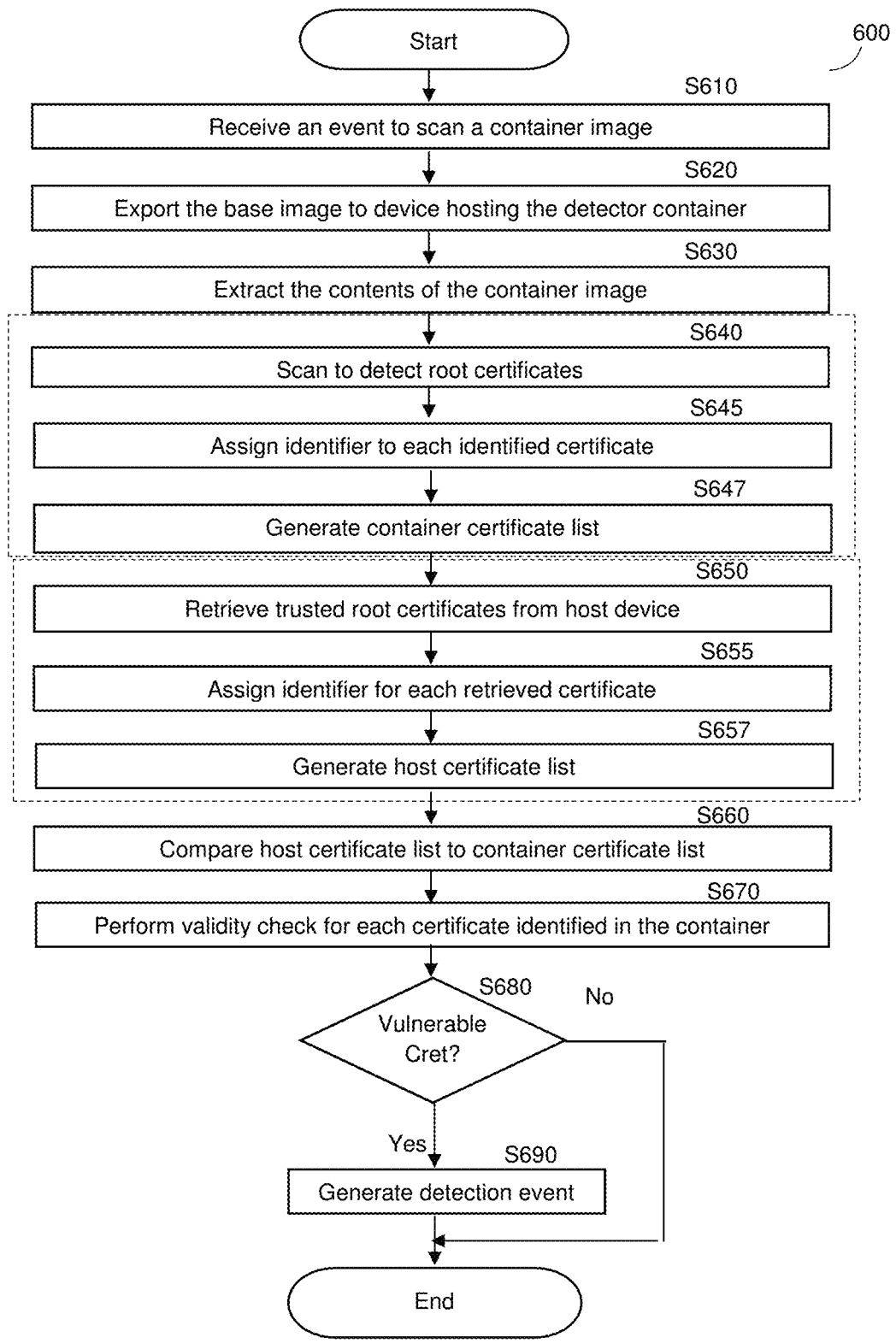
FIG. 6 is a flowchart illustrating a method for detecting vulnerable root certificates in container images according to an embodiment.

FIG. 6 shows an example flowchart 600 illustrating a method for detecting vulnerable root certificates included in container images according to an embodiment. The detection is performed prior to integration of a container image in a software container and, therefore, prior to running the software container.

At S610, an event indicating that a container image should be scanned is received. Such an event can be received when a new container image is uploaded to the host device or when an APP container respective of the container image is called for execution. For sake of simplicity of the discussion, the example flowchart 600 is discussed with respect to receiving a single event. It should be noted that additional events may be received without departing from the scope of the disclosure. Further, multiple container images can be processed in parallel.

At optional S620, the container image to be scanned is exported from its source location to the host device hosting the detector container. It should be emphasized that exporting the container image does not require executing the image on the host device.

At S630, the contents of the container image are extracted. In an embodiment, the extraction of the contents includes reformatting the container image into a data structure that can be processed. For example, before reformatting, the data structure may include, but is not limited to, a file having a standard format (e.g., a TAR file), a filesystem structure, and the like. In an example embodiment, reformatting the container image into a filesystem structure includes creating a container filesystem (e.g., using a Docker platform) for the container image.

At S640, the extracted contents are scanned to detect root certificates. In an embodiment, S640 includes searching for common file extensions associated with digital certificates. For example, common extensions defined in the X.509 standards include .CRT, .CER, and .KEY. Alternatively or collectively, the extracted contents are scanned to detect strings that formatted in one of the standard PKI formats. For example, search for information field names, such as "Signature Algorithm", "Subject". The scanning step looks for known values that are typically included in certificates, such as CA name. The scanning may be performed on decoded or encoded contents.

At S645, for each certificate identified during the search, a unique identifier is assigned. Examples for assigning unique identifiers are provided above. At S647, a container certificate list is generated. The list designates all identified certificates identified in the container image. An example list is shown in FIG. 4.

At S650, all trusted root certificates are retrieved from the host device, for example, from its certificate directory. Each operating system maintains the certificate directory in a different storage location. For example, the Linux's certificate directory is at /usr/local/share/ca-certificates.

At S655, for each certificate retrieved from the host's certificate directory, a unique identifier is assigned. The unique identifier of a host certificate is the same field used for assigning an identifier for a container certificate. At S657, a host certificate list is generated. The list designates all certificates trusted by the host device.

At S660, the host certificate list is compared to the container certificate list to determine if there is at least one certificate designated in the container certificate list, but not in the host certificate list.

At S670, a validity check is performed for each public certificate identified in the container certificate list. As discussed above, the validity check process compares the contents of a public certificate to known and trusted contents of the same certificate.

At S680, it is checked if at least one such mismatching certificate has been identified, the validity check of a certificate failed, or both. If so, each of the respective root certificates is considered as vulnerable, and execution continues with S690; otherwise, execution ends.

At S690, a detection event is generated. The detection event may designate, for example, a container image identifier, any vulnerable certificate in the container, a type of the detected vulnerability, and so on. The identifier of a malicious container image is saved in the database, reported to an external system, or both. The detection event may trigger the execution of a prevention action.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting vulnerable root certificates in container images, comprising:
    receiving an event to scan at least one container image hosted in a host device, wherein the at least one container image includes resources utilized to execute, by the host device, at least a respective application container;
    extracting contents of layers of the at least one container image, wherein extracting the contents of layers of the at least one container image further comprises reformatting at least one base image into a data structure;
    scanning the extracted contents to generate a first list designating all root certificates included in the at least one container image, wherein scanning the extracted contents further comprises searching for strings formatted according to a standard public key infrastructure (PKI) format;
    generating a second list designating all root certificates trusted by the host device; comparing the first list to the second list to detect at least one root certificate designated in the first list but not in the second; and
    determining the at least one detected root certificate as vulnerable, wherein the detection of vulnerabilities in the at least one base image is performed prior to the execution of the at least the respective application container.

2. The method of claim 1, further comprising:
    checking each root certificate designated in the first list for validity; and
    determining any root certificate that failed the validity check as vulnerable.

3. The method of claim 2, further comprising:
    generating a detection event upon determination of at least one of the checked root certificates as vulnerable.

4. The method of claim 2, wherein checking each root certificate designated in the first list for validity further comprises:
    comparing contents of the root certificate to the contents of a respective trusted root certificate; and
    when the compared certificates contents do not match, determining the root certificate as vulnerable.

5. The method of claim 1, wherein scanning the extracted contents to generate the first list further comprises:
    scanning the extracted contents to identify a plurality of identified root certificates; assigning a unique identifier for each of the plurality of identified root certificates; and
    listing at least the unique identifier of each of the identified root certificate in the first list.

6. The method of claim 5, wherein scanning the extracted contents to identify the root certificates further comprises:
    searching for file name extensions of common digital certificates.

7. The method of claim 5, wherein generating the second list further comprises:
    retrieving the first list and the second list from a certificate directory in the host;
    assigning a unique identifier for each of the retrieved root certificate list; and
    listing at least the unique identifier of each of the retrieved root certificate list in the second list.

8. The method of claim 1, wherein the data structure includes at least one of: a file having a standard format and a file system structure.

9. A non-transitory computer readable medium having stored thereon instructions for causing a processing circuitry to execute a process for detecting vulnerable root certificates in container images, the process comprising:
    receiving an event to scan at least one container image hosted in a host device, wherein the at least one container image includes resources utilized to execute, by the host device, at least a respective software container;
    extracting contents of layers of the at least one container image, wherein extracting the contents of layers of the at least one container image further comprises reformatting at least one base image into a data structure;
    scanning the extracted contents to generate a first list designating all root certificates included in the at least one container image, wherein scanning the extracted contents further comprises searching for strings formatted according to a standard public key infrastructure (PKI) format;
    generating a second list designating all root certificates trusted by the host device; comparing the first list to the second list to detect at least one root certificate designated in the first list but not in the second; and
    determining the at least one detected root certificate as vulnerable, wherein the detection of vulnerabilities in the at least one base image is performed prior to the execution of the at least the respective software application container.

10. A host device for detecting vulnerable root certificates in container images, comprising:
    a processing system; and
    a memory, the memory containing instructions that, when executed by the processing system, configure the host device to:

receive an event to scan at least one container image hosted in a host device, wherein the at least one container image includes resources utilized to execute, by the host device, at least a respective application container;

extract contents of layers of the at least one container image;

reformat at least one base image into a data structure;

scan the extracted contents to generate a first list designating all root certificates included in the at least one container image, wherein scanning the extracted contents further comprises searching for strings formatted according to a standard public key infrastructure (PKI) format;

generate a second list designating all root certificates trusted by the host device;

compare the first list to the second list to detect at least one root certificate designated in the first list but not in the second; and determine the at least one detected root certificate as vulnerable, wherein the detection of vulnerabilities in the at least one base image is performed prior to the execution of the at least the respective application container.

11. The system of claim 10, wherein the host device is further configured to: check each root certificate designated in the first list for validity; and determine any root certificate that failed the validity check as vulnerable.

12. The host device of claim 11, wherein the host device is further configured to:

generate a detection event upon determination of at least one of the checked root certificates as vulnerable.

13. The host device of claim 11, wherein the host device is further configured to:

for each root certificate, compare contents of the root certificate to the contents of a respective trusted root certificate; and when the compared certificates' contents do not match for one of the root certificates, determining the root certificate as vulnerable.

14. The host device of claim 11, wherein the host device is further configured to:

scan the extracted contents to identify a plurality of identified root certificates;

assign a unique identifier for each of the plurality of the identified root certificates; and list at least the unique identifier of each of the identified root certificate in the first list.

15. The host device of claim 14, wherein the host device is further configured to:

search file name extensions of common digital certificates.

16. The host device of claim 15, wherein the host device is further configured to:

retrieve the first list and the second list from a certificate directory in the host;

assign a unique identifier for each of the retrieved root certificate list; and list at least the unique identifier of each of the retrieved root certificate list in the second list.

17. The host device of claim 10, wherein the data structure includes at least one of: a file having a standard format and a file system structure.

* * * * *